United States Patent [19]

Okada

[11] 3,934,886
[45] Jan. 27, 1976

[54] CORRUGATED RADIAL SPACER EXPANDER FOR COMPOUND OIL SCRAPING RINGS

[75] Inventor: Syoji Okada, Ohmiya, Japan

[73] Assignee: Nippon Piston Ring Co., Ltd., Tokyo, Japan

[22] Filed: Sept. 11, 1974

[21] Appl. No.: 505,190

[30] Foreign Application Priority Data
Sept. 11, 1973  Japan.............................. 48-101672

[52] U.S. Cl. ......................... 277/2; 277/9; 277/139; 267/1.5
[51] Int. Cl.² ........................................... F16J 9/06
[58] Field of Search ............ 277/9, 2, 11, 139, 160, 277/159; 267/1.5

[56] References Cited
UNITED STATES PATENTS

| | | | |
|---|---|---|---|
| 2,343,942 | 3/1944 | Teetor | 277/139 |
| 3,166,331 | 1/1965 | Warrick | 277/139 |
| 3,338,582 | 8/1967 | De Bruin | 277/2 |
| 3,488,060 | 1/1970 | Prasse | 277/2 |

*Primary Examiner*—Samuel B. Rothberg
*Attorney, Agent, or Firm*—Sughrue, Rothwell, Mion & Zinn

[57] ABSTRACT

A corrugated radial spacer expander to be combined with side rails to form a compound oil scraping ring for internal combustion engines. The spacer expander has an annular shape cut at a portion thereof to present two opposing ends and has a corrugation consisting of successively alternating valleys and crests which are connected by intermediate flanks. At each one of said ends, there is formed a protrusion which bridges the neighbouring flanks over a valley adjacent the end, which protrusion is so shaped and positioned to prevent the valley at one end from being received by the valley at the other end, thereby ensuring that the opposing ends are correctly positioned in end to end relation, which would otherwise deteriorate the expansion force of the expander to make the oil scraper ring inoperative.

5 Claims, 10 Drawing Figures

CORRUGATED RADIAL SPACER EXPANDER FOR COMPOUND OIL SCRAPING RINGS

BACKGROUND OF THE INVENTION

1. Field of the Invention

The present invention relates to oil scraper piston rings for internal combustion engines, and more particularly to compound oil scraper piston rings having corrugated radial spacer expander.

2. Description of the Prior Art

Compound oil scraper piston rings consisting of a corrugated spacer expander and two side rails have been preferred for use in modern high power and high speed internal combustion engines, because of their high contact pressure against the cylinder wall and good following character with respect to the cylinder wall. In addition, those compound oil scraper piston rings can conveniently prevent a pumping action since they can provide sealing at both their upper and lower surfaces.

A conventional compound oil scraper piston ring comprises a corrugated radial spacer expander which has a corrugation in the circumferential direction thereof. The corrugation consists of alternating valleys and crests connected by flanks interposed therebetween. This corrugated radial spacer expander is adapted for use in combination with two side rails which are meant to engate the cylinder wall to scrape the oil down and to keep the required gas tightness, which engagement is ensured by radial expansion force exerted by the spacer expander.

When the compound oil scraper piston ring is mounted on a piston, the spacer expander is opened at its opposing ends and is fitted into the peripheral groove in the piston, and then the two side rails are fitted.

It is inconvenient that, during this fitting of two side rails, the two opposing ends of the spacer expander are likely to overlay one on the other, i.e. the lower side of the valley of one end is caught by the upper side of the valley of the other end.

Unfortunately, there have been no means to make one become aware of this extraordinary overlapping before the piston is inserted into the cylinder.

It is clear that this overlapping renders the compound oil scraper ring in operative, because of the poor expansion force exterted by the spacer expander, resulting in increased lubricating oil consumption which may lead to an unexpected engine stalling.

SUMMARY OF THE INVENTION

It is therefore an object of the invention to overcome above described problems by providing an improved expander for compound oil scraping piston rings.

According to the invention, there is provided an expander for compound oil scraper piston ring, said expander having an annular shape cut at one portion thereof to present two opposing ends and having a circumferential corrugation consisting of successively alternating valleys and crests connected by intermediate flanks, characterized by protrusions formed to bridge neighbouring flanks over the bottoms of the valleys at respective opposing ends, said protrusions being so positioned and shaped that they may prevent the valley at one of said ends from being received by the valley at the other of said ends, when said ends are overlapped, one on the other.

These and other objects and advantageous features of the invention will become clear from the following description of the preferred embodiments taken in connection with accompanying drawings.

DETAILED DESCRIPTION OF THE PREFERRED EMBODIMENTS

Prior to the description of the preferred embodiment, an explanation will be made on a prior art spacer expander with reference to FIGS. 1 and 2.

Figure 1:
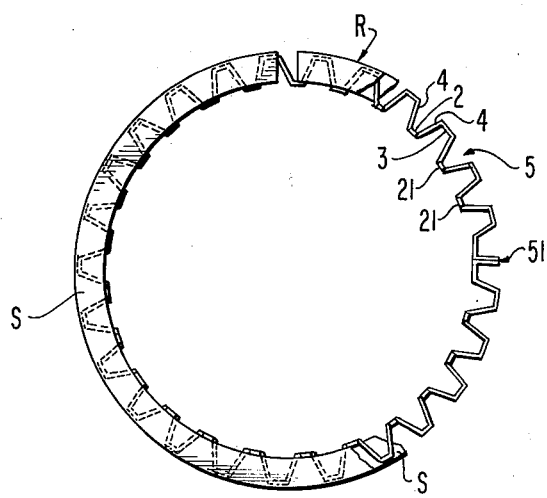
FIG. 1 is a plan view of a conventional spacer expander.
Figure 2:
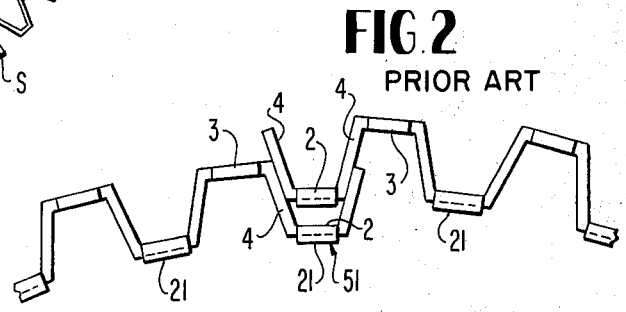
FIG. 2 is a partial enlarged plan view of the spacer expander as shown in FIG. 1 showing both ends being superimposed one on the other.

As shown in FIG. 1, a typical conventional compound piston ring R comprises corrugated radial spacer expander 5 consisting of an annular body cut at a portion thereof, and having a circumferential corrugation consisting of succesively alternating valleys 2 and crests 3 which are connected by intermediate flanks 4, each valleys 2 having projections 21 depending from both sides thereof.

Two sides rails S, S are combined to complete a ring R. It is inconvenient, as explained before, that the opposing ends, designated generally at numeral 51, are likely to be overlapped or superimposed one on the other, as shown in FIG. 2, when two side rails S, S are fitted onto the spacer expander 5. This overlapping of course deteriorates the contact pressure of the ring R against the cylinder wall to make the later inoperative for oil scraping, resulting in an increased lubricating oil consumption.

This problem is, however, fairly avoided in the preferred embodiments of the invention, as will be described hereinafter.

Figure 3:
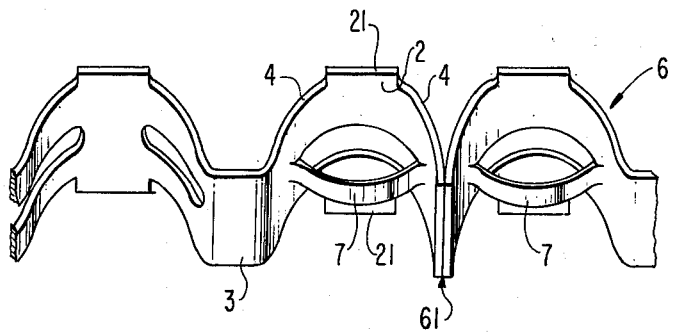
FIG. 3 is an enlarged perspective view of a spacer expander embodying the present invention.
Figure 4:
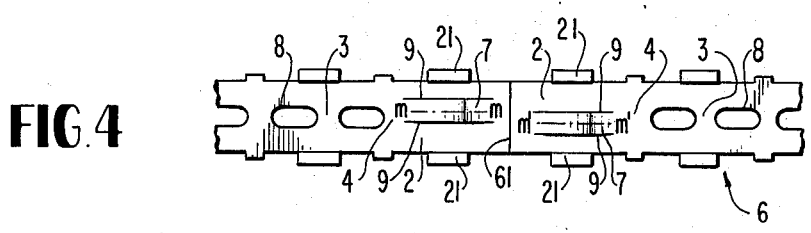
FIG. 4 is a developed front elevational view showing slits for forming protrusions of the end portions of the spacer expander in accordance with the invention.
Figure 5:
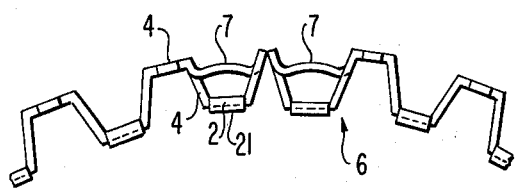
FIG. 5 is a partial enlarged plan view of a spacer expander embodying the invention showing two opposing ends being correctly engaged by each other.

Referring to FIGS. 3, 4 and 5, a compound oil scraper ring is manufactured from a blank which is punched out from a steel plate to have portions as valleys 2 and crests 3, projections 21, and oil receiving perforations 8, as shown in FIG. 4.

At portions which are bound to be respective one of opposing end portions 61 in the final product, there are formed two pairs of slits, one pair being at one of the ends while the other being at the other end.

The blank is then formed into an annular spacer expander having a corrugation which consists of successively alternating valleys 2 and crests 3 connected by intermediate flanks 4, as shown by FIG. 3. At the same time the portions of the blank between two slits of each pair are partially struck out or bent outwardly of the annular body to form a protrusion 7 at each of the opposing ends 61.

The protrusions 7 are so positioned that their central axes "m−m" and "m'−m'" do not coincide with each other, that is, they are laterally offset so that they cannot fit to each when the opposing ends are overlapped one on the other.

Figure 10:
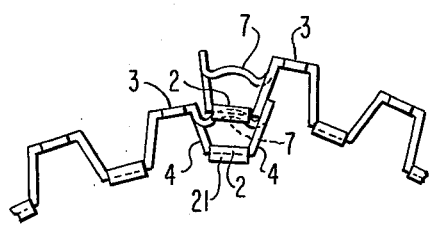
FIG. 10 is a partial enlarged plan view of a spacer expander with its opposing ends being superimposed one on the other.

Namely, even if the opposing ends of the expander are happened to be overlapped with the side rails are fitted to the expander in the peripheral groove of the piston, the upper one is prevented from being received by the lower one, as shown in FIG. 10, because of the presence of the protrusion 7.

In this condition, it is impossible to insert the piston into the cylinder, so that one can become aware of undesirable overlapping of the opposing ends of the expander. Therefore it is assured that the compound oil scraping rings of the invention are mounted with their expanders having opposing ends 61 correctly abutting each other, as shown by FIGS. 3 and 5.

It will be understood that the compound oil scraping rings of the invention are free from the unfavourable deterioration of contact pressure which has been likely to occur due to the overlapping of the opposing ends of the expander, and any problems resulted therefrom such as deterioration in the following property to the cylinder wall or increased lubricating oil consumption are fairly avoided.

FIGS. 6 to 9 show respective modifications.

Figure 6:
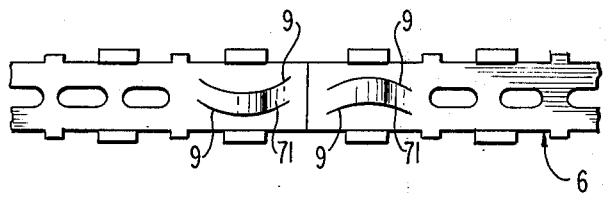
FIGS. 6 to 9 are developed front elevational views of respective embodiments of the invention.

In the modification of FIG. 6, the slits 9 are arcuate to form protrusions 71 bridging flanks 4 over the valley 2 at the end portions.

In this arrangement, it is necessary to form the arcuate pairs of slits inversed with respect to each other.

Figure 7:
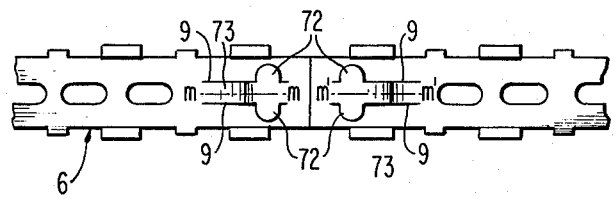
Figure 8:
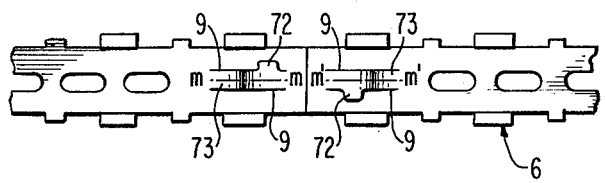

In the modifications of FIGS. 7 and 8, the central axes "m−m" and "m'−m'" of each pair of the slits 9 coincide with each other, however, a projections 72 formed in one or both slits in each pair of the slits 9 presents protrusions 73 for preventing one end from being received by the other.

Figure 9:
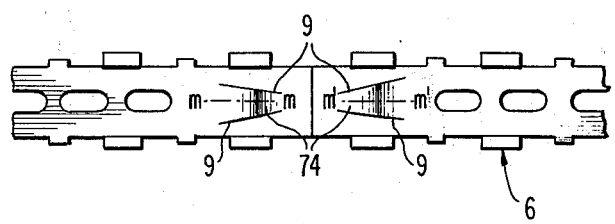

FIG. 9 shows another embodiment in which substantially trapezoidal protrusions 74, which serves equally to other protrusions 7, 71, 72, 73, although the central axes "m−m" and "m'−m'" coincide with each other.

Having described a specific embodiments of the compound oil scraping ring of the invention, it is believed obvious that modifications and variation of our inventions are possible in light of the above teachings.

For instance, the protrusions may be formed after the annular shape of the expander is completed, as well as simultaneously with the formation of oil receiving perforations. by means of a press.

What is claimed is:

1. In a corrugated radial spacer expander adapted for use in combination with side rails to form a compound oil scraper ring, said expander being annular in shape and severed to present two opposing ends and having a circumferential corrugation consisting of successively alternating valleys and crests connected by intermediate flanks, the improvement comprising: protrusions in the form of partially struck out integral strips of said expander longitudinally briding neighboring flanks over the bottom of adjacent valleys at respective opposing ends, said strips including integral portions which are laterally offset when said strips overlie each other which prevent the valley adjacent one end of said expander from being received within the valley adjacent the other end, when said ends are overlapped one on the other.

2. The radial spacer expander as claimed in claim 1, wherein said protrusions are equal width, partially struck out, integral strips whose circumferential axes are laterally offset with opposite side edges laterally overlapping.

3. The radial spacer expander as claimed in claim 1, wherein said protrusions comprise equal width, partially struck out, circumferentially aligned strips having lateral projections to opposite sides thereof.

4. The radial spacer expander as claimed in claim 1, wherein said protrusions comprise equal width, partially struck out, oppositely laterally curved, laterally overlapping strips.

5. The radial spacer expander as claimed in claim 1, wherein said protrusions comprise trapezoidal shaped strips whose axes are circumferentially aligned and whose sides taper in opposite directions.

* * * * *